(12) United States Patent
Midlam-Mohler et al.

(10) Patent No.: US 7,257,943 B2
(45) Date of Patent: Aug. 21, 2007

(54) SYSTEM FOR CONTROLLING NOX EMISSIONS DURING RESTARTS OF HYBRID AND CONVENTIONAL VEHICLES

(75) Inventors: Shawn Midlam-Mohler, Columbus, OH (US); Brandon Masterson, Whitmore Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 496 days.

(21) Appl. No.: 10/710,649

(22) Filed: Jul. 27, 2004

(65) Prior Publication Data

US 2006/0021330 A1    Feb. 2, 2006

(51) Int. Cl.
*F01N 3/00* (2006.01)
(52) U.S. Cl. ............................ 60/285; 60/276; 60/299
(58) Field of Classification Search .................. 60/276, 60/277, 285, 299
See application file for complete search history.

(56) References Cited

U.S. PATENT DOCUMENTS

| | | | |
|---|---|---|---|
| 6,173,569 B1 | 1/2001 | Kusada et al. | |
| 6,289,673 B1 | 9/2001 | Tayama et al. | |
| 6,327,852 B1 | 12/2001 | Hirose | |
| 6,560,960 B2 | 5/2003 | Nishimura et al. | |
| 6,581,371 B1* | 6/2003 | Orzel et al. | 60/277 |
| 6,622,478 B2 | 9/2003 | Nakamura | |
| 6,629,408 B1 | 10/2003 | Murakami et al. | |
| 6,637,191 B1 | 10/2003 | Ziemba et al. | |
| 6,675,574 B2 | 1/2004 | Nakagawa et al. | |
| 6,792,750 B2* | 9/2004 | Nagai et al. | 60/285 |
| 6,901,744 B2* | 6/2005 | Kako et al. | 60/285 |
| 2003/0005684 A1 | 1/2003 | Lewis et al. | |
| 2003/0017603 A1 | 1/2003 | Uchida et al. | |
| 2003/0046927 A1 | 3/2003 | Nagai et al. | |
| 2003/0056495 A1 | 3/2003 | Lewis et al. | |

FOREIGN PATENT DOCUMENTS

| | | |
|---|---|---|
| EP | 0 982 488 B1 | 3/2000 |
| JP | 2003-148201 A | 5/2003 |

OTHER PUBLICATIONS

Cornelius, S.J., et al., *The role of oxygen storage in NO conversion in automotive catalysts*, Topics in Catalysis vol. 16/17, Issue 1/4, Sep. 2001, pp. 57-62.

\* cited by examiner

*Primary Examiner*—Thomas Denion
*Assistant Examiner*—Diem Tran
(74) *Attorney, Agent, or Firm*—David B. Kelley; Brooks Kushman P.C.

(57) ABSTRACT

A system for controlling exhaust emission oxides of nitrogen (NOx) during restarts of an internal combustion engine (ICE). The system includes a first sensor for determining a first level of exhaust gas oxygen at a location upstream of a catalytic converter, a second sensor for determining a second level of exhaust gas oxygen at a location mid-bed of the catalytic, and a controller for performing at least one process to reduce NOx emissions when a difference between the first level of exhaust gas oxygen and the second level of exhaust gas oxygen exceeds a predetermined amount.

16 Claims, 2 Drawing Sheets

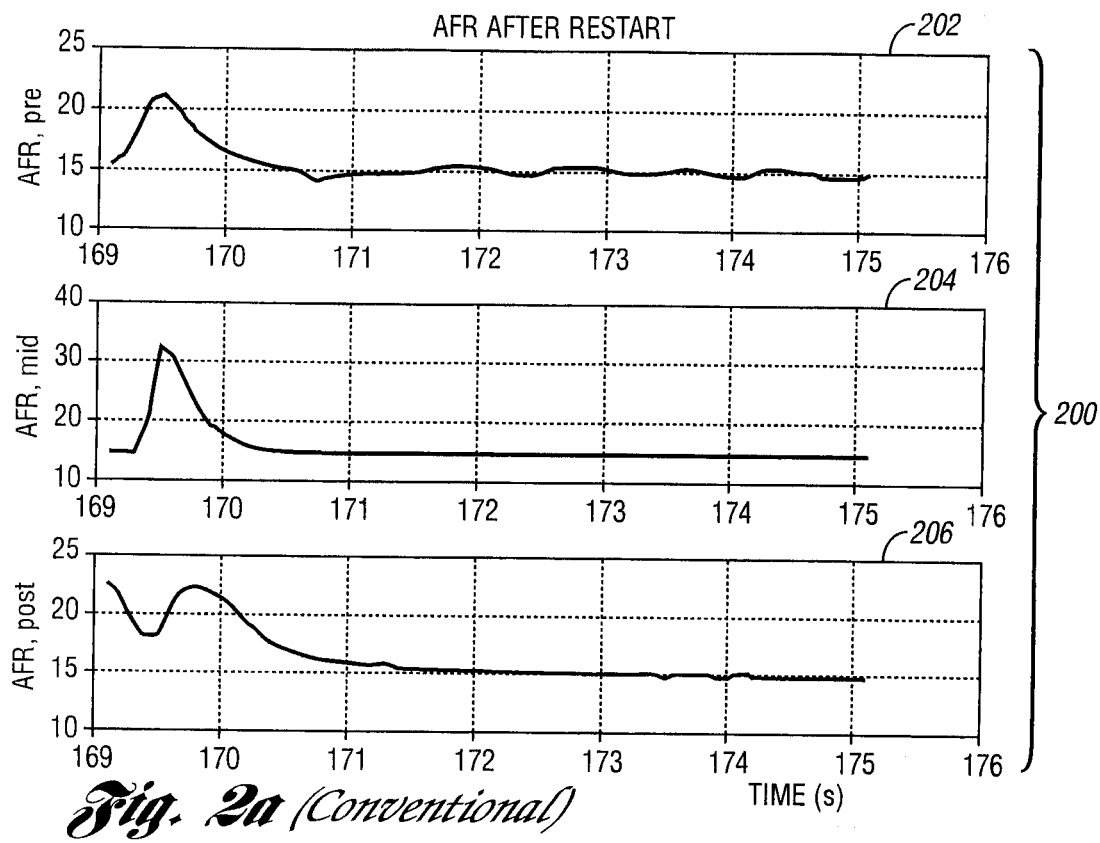
*Fig. 2a (Conventional)*

SYSTEM FOR CONTROLLING NOX EMISSIONS DURING RESTARTS OF HYBRID AND CONVENTIONAL VEHICLES

BACKGROUND OF INVENTION

1. Field of the Invention

The invention relates generally to a system and method for a strategy for monitoring and controlling engine NOx emissions, and more particularly to a system and method for monitoring and controlling NOx emissions during restarts of hybrid and conventional vehicles.

2. Background Art

Hybrid electric vehicles (HEVs) utilize a combination of an internal combustion engine (ICE) in connection with an electric motor. The electric motor is fed electrical energy from a battery to provide the power needed to propel a vehicle (i.e., provide power to vehicle wheels) for improved fuel economy when compared to a conventional (i.e., an internal combustion engine only) vehicle. In a hybrid vehicle, fuel economy can be improved and exhaust emissions can be reduced by shutting down (i.e., turning off) the engine, especially when the ICE operates inefficiently, and using the electric motor to provide all of the power needed to propel the vehicle. As such, hybrid electric vehicles (HEVs) typically perform engine shut off and restart operations frequently while driving.

However, when the user (e.g., driver of the vehicle) wants more power than the electric motor can provide or when the battery becomes depleted, the engine is generally restarted to provide the requested additional power. During engine shut downs and restarts, air is pumped by the engine into the exhaust system. An exhaust system catalyst adsorbs the oxygen from the air. Frequently, the volume of the adsorbed oxygen is sufficient to saturate the oxygen storage capacity of the catalyst. A three-way catalyst (TWC) that has a saturated or nearly saturated oxygen storage capacity can have diminished NOx conversion ability. When combustion is resumed (i.e., when the engine is restarted), the NOx emissions from the engine typically are not efficiently reduced or eliminated by the catalytic converter until the oxygen storage level in the catalytic converter is reduced from the saturated level.

Conventional non-hybrid vehicles (i.e., vehicles that are powered only be an internal combustion engine) operate under similar circumstances during deceleration fuel shutoff. As such, conventional vehicles can have diminished NOx conversion ability during deceleration fuel shutoff.

One example of a conventional approach to controlling exhaust emissions for ICEs is disclosed in U.S. Pat. No. 6,629,408. The exhaust emission control system includes first and second oxygen concentration sensors respectively provided upstream and downstream of the nitrogen oxide removing device for detecting an oxygen concentration in the exhaust gases. The air-fuel ratio of an air-fuel mixture to be supplied to the engine is changed from a lean region to a rich region with respect to a stoichio-metric ratio. An amount of reducing components flowing into the nitrogen oxide removing device from the time when an output value from the first oxygen concentration sensor has changed to a value indicative of a rich air-fuel ratio after enrichment of the air-fuel ratio is calculated. Deterioration of the nitrogen oxide removing device is determined according to the calculated amount of reducing components and an output value from the second oxygen concentration sensor. However, such conventional approaches generally fail to monitor and predict the effectiveness of the HEV and conventional ICE vehicle restart emissions performance, and fail to provide remedial processes.

Thus, to efficiently and effectively provide for controlling exhaust emissions for ICEs, there is a need for an improved system and method for monitoring NOx emissions during restarts of hybrid vehicles and conventional vehicles.

SUMMARY OF INVENTION

The system and method of the present invention generally provides information on the NOx conversion performance of vehicles during stop-start events. The present invention may be advantageously implemented in connection with hybrid electric vehicles (HEVs) and in connection with conventionally powered (i.e., internal combustion engine only) vehicles. In one example, the present invention may use conventional heated exhaust gas oxygen sensors (HEGOs). In another example, the present invention may use wideband (universal) exhaust gas oxygen sensors (UEGOs). In yet another example, the present invention may use a combination of HEGO and UEGO EGO sensors.

The system and method of the present invention generally provide for on-board diagnosis (OBD) of NOx performance during an engine stop-start event. The system and method of the present invention generally provide feedback to the emissions control strategy on the emissions conversion performance of the vehicle. The feedback generally provides improved or optimized performance of the emissions control system.

A system and method is disclosed that substantially overcomes the limitations and shortcomings of conventional emissions control systems and methods. In accordance with one embodiment of the present invention, a system for controlling exhaust emission oxides of nitrogen (NOx) during restarts of an internal combustion engine (ICE) is disclosed. The system includes a first sensor for determining a first level of exhaust gas oxygen at a location upstream of a catalytic converter, a second sensor for determining a second level of exhaust gas oxygen at a location mid-bed of the catalytic, and a controller for performing at least one process to reduce NOx emissions when a difference between the first level of exhaust gas oxygen and the second level of exhaust gas oxygen exceeds a predetermined amount.

Further, a system for controlling exhaust emission oxides of nitrogen (NOx) during restarts of an internal combustion engine (ICE) is disclosed. The system includes a first sensor for determining a first level of exhaust gas oxygen at a location mid-bed of a catalytic converter, a second sensor for determining a second level of exhaust gas oxygen at a location downstream of the catalytic converter, and a controller for performing at least one process to reduce NOx emissions when a difference between the first level of exhaust gas oxygen and the second level of exhaust gas oxygen exceeds a predetermined amount.

Yet further, a system for controlling exhaust emission oxides of nitrogen (NOx) during restarts of an internal combustion engine (ICE) is disclosed. The system includes a first sensor for determining a first level of exhaust gas oxygen a location upstream of a three-way catalytic converter (TWC), a second sensor for determining a second level of exhaust gas oxygen at a location mid-bed of the TWC, a third sensor for determining a third level of exhaust gas oxygen a location downstream of the TWC, and a controller for dynamically monitoring the exhaust gas oxygen level at the locations in the exhaust system and performing at least one process to reduce NOx emissions when a difference between the levels of exhaust gas oxygen exceeds a predetermined amount.

Further advantages, objectives and features of the invention will become apparent from the following detailed description and the accompanying figures disclosing illustrative embodiments of the invention.

DETAILED DESCRIPTION

The effectiveness of the internal combustion engine (ICE) restart exhaust gas emissions performance may be monitored and predicted by monitoring exhaust gas oxygen (EGO) sensor (e.g., heated exhaust gas oxygen (HEGO) sensor, and universal or wide-band exhaust gas oxygen (UEGO) sensor) response using the system and method of the present invention.

During shutdown, the ICE typically pumps a volume of oxygen into the exhaust gas such that the exhaust gas reaches the engine-out exhaust gas oxygen sensor (e.g., EGO, HEGO or UEGO). The oxygen rich exhaust gas does not typically reach a mid-bed exhaust gas oxygen sensor or a post-catalyst exhaust gas oxygen sensor when the engine shut down is performed as planned (i.e., as intended). The presence of excessively lean exhaust at either of the mid-bed exhaust gas oxygen sensor or the post-catalyst exhaust gas oxygen sensor is generally caused by a system fault. When the system fault is indicated, the system and method of the present invention generally provide for at least one remedial process or operation to improve (i.e., reduce the level of) the exhaust gas emissions generally, and in particular, improve the level of the exhaust gas oxides of nitrogen (NOx).

During engine shutdowns and restarts, air is pumped by the engine into the exhaust system. An exhaust system catalyst adsorbs the oxygen from the air. Frequently, the volume of the adsorbed oxygen is sufficient to saturate the oxygen storage capacity of the catalyst. A three-way catalyst (TWC) that has a saturated or nearly saturated oxygen storage capacity can have poor NOx conversion ability (i.e., poor ability to buffer lean air-to-fuel (AFR) transients), and so-called NOx breakthrough occurs. When combustion is resumed (i.e., when the engine is restarted), the NOx emissions from the engine are not efficiently reduced or eliminated by the catalytic converter until the oxygen storage level in the catalytic converter is reduced from the saturated level.

A vehicle powertrain emissions control system and method of the present invention may dynamically control NOx breakthrough (i.e., reduce the NOx exhaust emissions from the engine) by implementing the one or more remedial processes (i.e., strategies, operations, routines, steps, blocks, algorithms, etc.) that generally provide a more rich AFR post engine restart condition than would occur were such processes not implemented as in conventional approaches. Such remedial processes generally include, but are not limited to, minimizing pumped oxygen (e.g., closing throttle (not shown) during shutdown and beginning fueling for engine restart sooner), providing rich fueling during the engine restart condition to recondition the catalyst, delaying the restart for a predetermined time, or limiting the number of restarts to a predetermined number during a selected interval of time, and any other appropriate process to meet the design criteria of a particular application.

Figure 1:
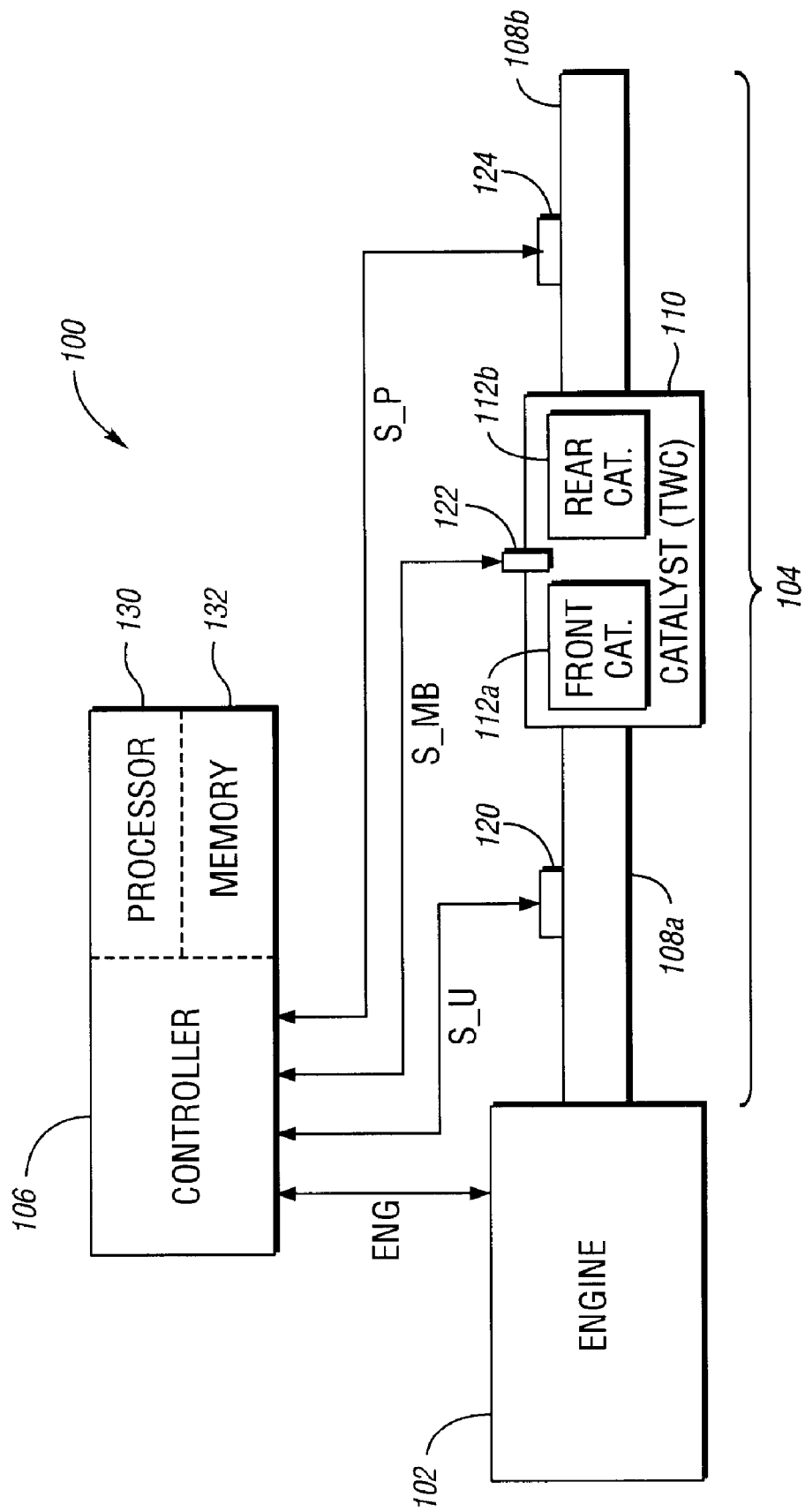
FIG. 1 is a diagram of a powertrain system of the present invention.

Referring to FIG. 1, a diagram of a powertrain system 100 of the present invention is shown. The system 100 generally comprises an ICE 102, an engine exhaust system 104, and a controller (e.g., powertrain control module (PCM), engine control module (ECM), and the like) 106. The ICE 102 may be implemented as an engine that is fueled by gasoline, diesel, methane, propane, alcohol, etc. In one example, the system 100 may be advantageously implemented in connection with a hybrid electric vehicle propulsion system. In another example, the system 100 may be advantageously implemented in connection with a conventional (i.e., ICE only) vehicle propulsion system.

The exhaust system 104 generally comprises an exhaust pipe section 108a, an exhaust pipe section 108b, and a catalytic converter (i.e., catalyst) 110. The exhaust system 104 generally receives exhaust gas from the engine 102 and presents the engine exhaust gas to the atmosphere. A first end of the pipe 108a may be connected to the engine 102 (e.g., at an exhaust manifold) and a second end of the pipe 108a may be connected to an inlet of the catalyst 110. An outlet of the catalyst 110 may be connected to a first end of the pipe 108b and a second end of the pipe 108b may present the engine exhaust gas to the atmosphere (i.e., the pipe 108b is generally implemented as a tailpipe).

The catalyst 110 is generally implemented as a three-way catalyst (TWC, i.e., a catalytic converter for simultaneous removal of CO, NOx, and HC pollutants from the engine exhaust gas and having a first or front catalyst 112a at the inlet end and a second or rear catalyst 112b at the outlet end). A number of engine exhaust gas oxygen (EGO) sensors are generally installed (i.e., mounted, fastened, etc.) at various locations in the exhaust system 104 to dynamically determine exhaust gas oxygen levels at the respective installation locations. An engine-out oxygen (EGO) sensor 120 may be installed in the pipe 108a, a mid-bed oxygen (EGO) sensor 122 may be installed at a mid-bed location in the catalyst 110 (i.e., at a location between the front catalyst 112a and the rear catalyst 112b in the TWC 110), and a downstream (or post-catalyst) oxygen (EGO) sensor 124 may be installed in the pipe 108b. Generally, the system and method of the present invention may be implemented using, in one example, a combination of the sensors 120 and 122, in another example, a combination of the sensors 122 and 124, and in yet another example, a combination of the sensors 120, 122, and 124.

In one example, the sensors 120, 122 and 124 may be implemented as UEGO sensors. In another example, the sensors 120, 122 and 124 may be implemented as HEGO sensors. In yet another example, the sensors 120, 122 and 124 may be implemented as a combination of UEGO sensors and HEGO sensors.

The improved system and method for dynamically controlling engine exhaust emissions of the present invention is generally implemented in connection with a processor 130 and at least one memory (e.g., random access memory (RAM), read only memory (ROM), EPROM, EEPROM, flash, etc.) 132 in the controller 106. The engine 102 and the sensors 120, 122 and 124 are generally electrically connected (coupled) to and in communication with the processor 106.

The powertrain controller 106 generally presents/receives a number of signals that may be processed (e.g., filtered, compared, logically operated upon, analyzed, etc.) to determine (i.e., detect) when an improper (or proper) engine restart has occurred, and to initiate one or more corrective (i.e., remedial) processes when an improper engine restart has occurred. The processes performed using the controller 106 may be implemented in connection with on-board diagnosis (OBD) of NOx performance.

The improper engine restart detection and the one or more corrective processes of the present invention may be implemented in hardware (e.g., logic circuitry), software, firmware, and any appropriate combination thereof to meet the design criteria of a particular application. The engine 102 may present/receive a signal (e.g., ENG) to/ from the processor 106, the EGO sensor 120 may present/receive a signal (e.g., S_U) to/from the processor 106, the EGO sensor 122 may present/receive a signal (e.g., S_MB) to/from the processor 106, the EGO sensor 124 may present/receive a signal (e.g., S_P) to/from the processor 106. The signal ENG generally provides information regarding operating conditions of the engine 102 (e.g., engine speed, crankshaft position, component temperatures, etc.). The signals S_U, S_MB, and S_P are generally related engine air-to-fuel ratio (AFR).

During restart of the engine 102, some additional oxygen is pumped into the exhaust system 104. Very rapidly, the engine 102 should begin combusting. When the EGO sensors 120, 122 and 124 are implemented as UEGO sensors, the engine-out oxygen sensor 120 generally reads (determines) the oxygen level of the exhaust gas (e.g., generates and presents the signal S_U). The restart of the engine 102 may be indicated by the oxygen sensor 120 via the signal S_U. That is, the signal S_U may exceed a first predetermined level (i.e., amount, quantity, etc.).

Typically, slightly rich exhaust gas is desirable to provide appropriate exhaust gas NOx emissions performance. The slightly rich exhaust gas may also be detected by the sensor 120 and indicated via the signal S_U (i.e., the signal S_U may exceed a second predetermined level that is generally higher than the first predetermined level).

In one example, when the system 100 is implemented using a mid-bed oxygen sensor 122 in connection with the engine-out oxygen sensor 120, the sensor 122 (i.e., the signal S_MB) generally indicates no or very low level lean response when compared to the condition of the exhaust gas at the engine-out sensor 120 (i.e., the signal S_U). That is, the signal S_MB may be lower than a third predetermined level, and the third predetermined level is generally lower than the first predetermined level and the second predetermined level.

The sensor 122 will generally indicate a low level lean response (i.e., the signal S_MB may be lower than the third predetermined level) when the catalyst 110 has adsorbed a majority of the oxygen that was pumped into the exhaust 104 without saturating the oxygen storage of the catalyst 110. However, when the catalyst 110 is saturated with oxygen, oxygen generally breaks through the catalyst 110 and produces a lean reading in the mid-bed sensor (i.e., the signal S_MB may exceed the third predetermined level).

A non-saturated catalyst 110 during the restart operation of the engine 102 is generally a direct indication of good NOx performance by the system 100. However, a catalyst 110 that is saturated during the restart operation of the engine 102 is generally an indication of diminished NOx performance by the system 100.

When a diminished NOx reduction (or elimination) performance has been determined (e.g., via analysis of the signals S_U and S_MB using the controller 106 to calculate, determine, compare, etc. that the signal S_U exceeds the second predetermined level and the signal S_MB exceeds the third predetermined level), the controller 106 generally initiates and controls at least one remedial operation (i.e., process, response, method, algorithm, steps, blocks, routine, etc.) of the system 100 in response to the poor NOx performance. That is, the controller 106 generally initiate and controls a process to reduce NOx emissions when a difference between the first level of exhaust gas oxygen (e.g., the signal S_U) and the second level of exhaust gas oxygen (e.g., the signal S_MB) exceeds a fourth predetermined amount.

In another example, the system 100 may be implemented using the post-catalyst (or downstream) oxygen sensor 124 in connection with the mid-bed oxygen sensor 122. When the mid-bed catalyst oxygen sensor 122 generates a signal S_MB that indicates the exhaust gas is lean (i.e., the signal S_MB exceeds the third predetermined level) and the downstream oxygen sensor 124 does not indicate that the exhaust gas is lean (i.e., the signal S_P does not exceed the third predetermined level), the first catalyst within the TWC 110 is generally saturated but the rear catalyst within the TWC 110 is generally not saturated, the NOx performance may be acceptable, and no remedial operation is initiated and controlled by the controller 106.

That is, the controller 106 generally initiates and controls a process to reduce NOx emissions when a difference between the first level of exhaust gas oxygen (e.g., the signal S_MB) and the second level of exhaust gas oxygen (e.g., the signal S_P) exceeds the fourth predetermined amount.

In another example, the EGO sensors 120, 122 and 124 may be implemented as HEGO sensors or a combination of UEGO sensors and HEGO sensors. HEGO sensors (e.g., the sensors 120, 122 and 124) generally provide an indication of a switch of AFR from lean to rich or a switch from rich to lean. The predetermined levels related to the signals S_U, S_MB and S_P and the predetermined differences may comprise binary levels (i.e., the signals and levels may be presented as "on" (i.e., asserted) as a digital True, HIGH, or 1 state, and "off" (i.e., de-asserted) as a digital False, LOW, or 0 state).

The time between the switching of the sensors and other events related to the stop-start process (e.g., detection of engine restart based on powertrain component speed and torque parameters) may provide additional information on the restart process that may be included in the analysis and correction processes of the present invention. HEGO sensors are generally lower in cost and may be more readily available than UEGO sensors.

In yet another example, the signals S_U, S_MB, and S_P presented by the sensors 120, 122, and 124, respectively, may all be implemented to determine when the TWC 110 has diminished NOx elimination performance. The controller 106 generally initiates and controls at least one process to reduce NOx emissions when a combination of the signals S_U, S_MB, and S_P indicate diminished NOx elimination performance as described above.

Figure 2B:
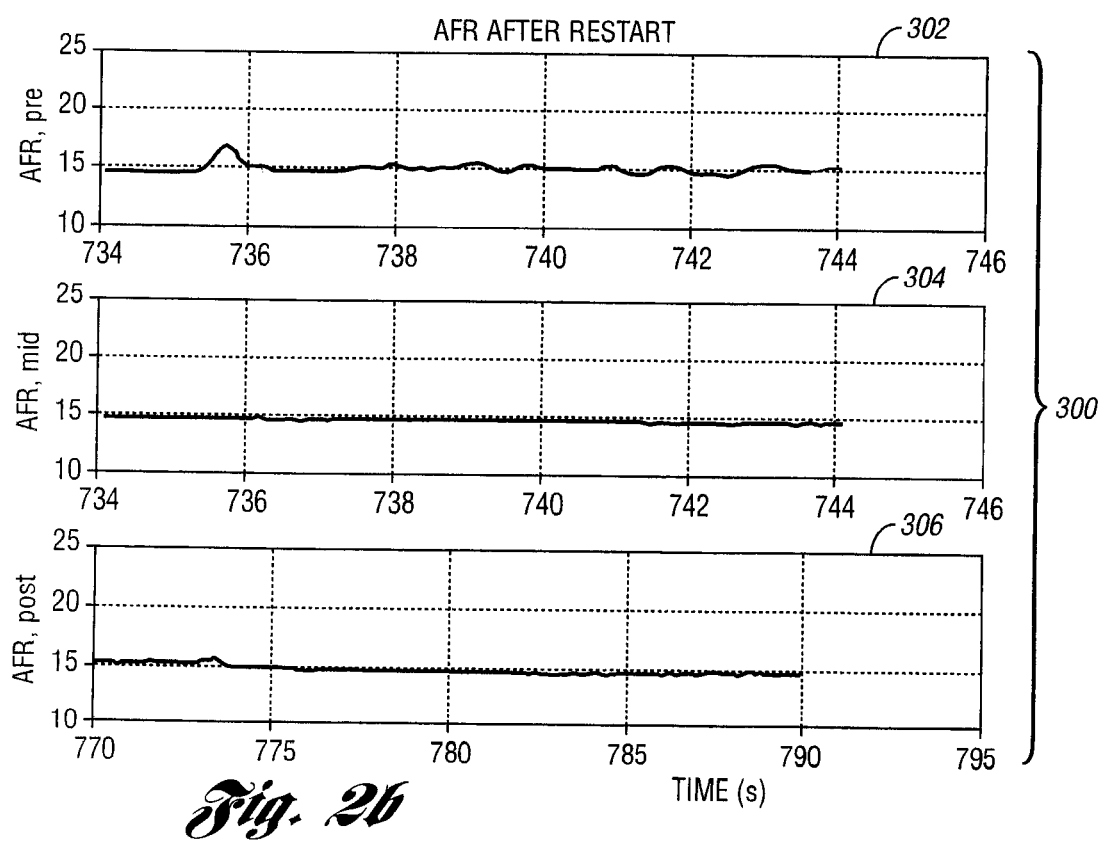
FIGS. 2(a-b) are diagrams of plots of air-to-fuel ratio for a conventional powertrain system and a powertrain system according to the present invention.

Referring to FIGS. 2(a-b), a diagram 200 of an engine restart with poor NOx conversion in connection with a conventional approach and a diagram 300 of an engine restart with good NOx conversion in connection with the present invention are shown, respectively. The plots 202 and 302 illustrate the respective signal S_U, the plots 204 and 304 illustrate the respective signal S_MB, and the plots 206 and 306 illustrate the respective signal S_P.

The system and method of the present invention generally provides information on the NOx conversion performance of vehicles during stop-start events. The present invention may be advantageously implemented in connection with hybrid electric vehicles (HEVs) and in connection with conventionally powered (i.e., internal combustion engine only) vehicles. In one example, the present invention may use conventional heated exhaust gas oxygen sensors (HEGOs). In another example, the present invention may use wideband (universal) exhaust gas oxygen sensors (UEGOs). In yet another example, the present invention may use a combination of HEGO and UEGO EGO sensors.

The system and method of the present invention generally provide for on-board diagnosis (OBD) of NOx performance during an engine stop-start event. The system and method of the present invention generally provide feedback to the emissions control strategy on the emissions conversion performance of the vehicle. The feedback generally provides improved or optimized performance of the emissions control system when compared to conventional approaches.

While the best mode for carrying out the invention has been described in detail, those familiar with the art to which this invention relates will recognize various alternative designs and embodiments for practicing the invention as defined by the following claims.

The invention claimed is:

1. A system for controlling exhaust emission oxides of nitrogen (NOx) during restarts of an internal combustion engine (ICE), the system comprising:
    a first sensor for determining a first level of exhaust gas oxygen at a location upstream of a catalytic converter;
    a second sensor for determining a second level of exhaust gas oxygen at a location mid-bed of the catalytic; and
    a controller for performing at least one process to reduce NOx emissions when a difference between the first level of exhaust gas oxygen and the second level of exhaust gas oxygen exceeds a predetermined amount, the at least one process comprising at least one of delaying an engine restart for a predetermined time or limiting the number of restarts to a predetermined number during a selected interval of time.

2. The system set forth in claim 1 wherein the at least one process to reduce NOx emissions further comprises providing rich fueling during the engine restart condition to recondition the catalytic converter.

3. The system set forth in claim 1 wherein at least one of the first and second levels of exhaust gas oxygen are determined using a heated exhaust gas oxygen (HEGO) sensor.

4. The system set forth in claim 1 wherein at least one of the first and second levels of exhaust gas oxygen are determined using a universal exhaust gas oxygen (UEGO) sensor.

5. The system set forth in claim 1 wherein the catalytic converter is a three-way catalytic converter (TWC).

6. The system set forth in claim 1 wherein the at least one process to reduce NOx emissions further comprises minimizing pumped oxygen.

7. The system set forth in claim 6 wherein minimizing pumped oxygen comprises closing a throttle during shutdown.

8. A system for controlling exhaust emission oxides of nitrogen (NOx) during restarts of an internal combustion engine (ICE), the system comprising:
    a first sensor for determining a first level of exhaust gas oxygen at a location mid-bed of a catalytic converter;
    a second sensor for determining a second level of exhaust gas oxygen at a location downstream of the catalytic converter; and
    a controller for performing at least one process to reduce NOx emissions when a difference between the first level of exhaust gas oxygen and the second level of exhaust gas oxygen exceeds a predetermined amount, the at least one process comprising at least one of delaying an engine restart for a predetermined time or limiting the number of restarts to a predetermined number during a selected interval of time.

9. The system set forth in claim 8 wherein the at least one process to reduce NOx emissions further comprises providing rich fueling during the engine restart condition to recondition the catalytic converter.

10. The system set forth in claim 8 wherein at least one of the first and second levels of exhaust gas oxygen are determined using a heated exhaust gas oxygen (HEGO) sensor.

11. The system set forth in claim 8 wherein at least one of the first and second levels of exhaust gas oxygen are determined using a universal exhaust gas oxygen (UEGO) sensor.

12. The system set forth in claim 8 wherein the catalytic converter is a three-way catalytic converter (TWC).

13. The system set forth in claim 8 wherein the at least one process to reduce NOx emissions further comprises minimizing pumped oxygen.

14. The system set forth in claim 13 wherein minimizing pumped oxygen comprises closing a throttle during shutdown.

15. A system for controlling exhaust emission oxides of nitrogen (NOx) during restarts of an internal combustion engine (ICE), the system comprising:
    a first sensor for determining a first level of exhaust gas oxygen a location upstream of a three-way catalytic converter (TWC);
    a second sensor for determining a second level of exhaust gas oxygen at a location mid-bed of the TWC;
    a third sensor for determining a third level of exhaust gas oxygen a location downstream of the TWC; and
    a controller for dynamically monitoring the exhaust gas oxygen level at the locations in the exhaust system and performing at least one process to reduce NOx emissions when a difference between the levels of exhaust gas oxygen exceeds a predetermined amount, the at least one process comprising at least one of delaying an engine restart for a predetermined time or limiting the number of restarts to a predetermined number during a selected interval of time.

16. The system set forth in claim 15 wherein the process to reduce NOx emissions further comprises at least one of minimizing pumped oxygen or providing rich fueling during the engine restart condition to recondition the catalytic converter.

* * * * *